(12) United States Patent
Kirchner et al.

(10) Patent No.: US 8,185,249 B2
(45) Date of Patent: May 22, 2012

(54) WIND FARM POWER PRODUCTION CONTROL SYSTEM

(75) Inventors: Andreas Kirchner, Osnabruek (DE); Enno Ubben, Steinfurt (DE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/017,588

(22) Filed: Jan. 31, 2011

(65) Prior Publication Data

US 2011/0156391 A1 Jun. 30, 2011

(51) Int. Cl.
*H02K 3/32* (2006.01)
(52) U.S. Cl. .............. 700/287; 290/44; 307/46
(58) Field of Classification Search .......... 700/286, 700/287; 307/46, 48; 290/44, 55
See application file for complete search history.

(56) References Cited

U.S. PATENT DOCUMENTS

| 2004/0260489 A1 | 12/2004 | Mansingh |
| 2008/0167756 A1 | 7/2008 | Golden |
| 2009/0027002 A1* | 1/2009 | Stahlkopf .................. 320/101 |
| 2009/0160187 A1* | 6/2009 | Scholte-Wassink ............ 290/44 |
| 2009/0230689 A1 | 9/2009 | Burra |

* cited by examiner

*Primary Examiner* — Ryan Jarrett
(74) *Attorney, Agent, or Firm* — Cantor Colburn LLP

(57) ABSTRACT

A control system for an energy production facility includes a plant controller for receiving an indication of a measured power output of the energy production facility that includes power generators and produces output signals. The system also includes a processing unit operably coupled to the plant controller and responsive to executable computer instructions when executed on the processing unit cause the plant controller to: create an output signal that causes an energy storage device to discharge in the event power reserves of the power generators can not met the requested ramp down rate; and create an output signal that causes the energy storage device to charge up in the event that the power capability of the power generators can meet the requested ramp down rate.

5 Claims, 5 Drawing Sheets

WIND FARM POWER PRODUCTION CONTROL SYSTEM

CROSS-REFERENCE TO RELATED APPLICATIONS AND PRIORITY CLAIM

This application claims the benefit of U.S. Nonprovisional application Ser. No. 12/582,053, entitled "POWER PRODUCTION CONTROL SYSTEM AND METHOD", filed Oct. 20, 2009, under 35 U.S.C. §120, which is incorporated herein by reference in its entirety.

BACKGROUND OF THE INVENTION

The subject matter disclosed herein relates to energy production and, in particular, to controlling energy production facilities in the presence of variable production capabilities.

The production of energy in the form of electricity may take many forms. At the center of nearly all power stations is a generator, a rotating machine that converts mechanical energy into electrical energy by creating relative motion between a magnetic field and a conductor. The energy source harnessed to turn the generator varies widely. One energy source is wind.

A wind farm is a group of wind turbines in the same location used for production of electric power. Individual turbines are interconnected with a medium voltage (usually 34.5 kV) power collection system and a communications network. At a substation, this medium-voltage electrical current is increased in voltage with a transformer for connection to the high voltage transmission system. The high voltage transmission system is often referred to as a "grid."

A large wind farm may consist of a few dozen to about 100 individual wind turbines, and cover an extended area of hundreds of square miles (square kilometers). A wind farm may be located off-shore to take advantage of strong winds blowing over the surface of an ocean or lake.

As is well known, electricity generated from wind can be highly variable at several different timescales: from hour to hour, daily, and seasonally. Annual variation also exists, but is not as significant. Because instantaneous electrical generation and consumption must remain in balance to maintain grid stability, this variability can present substantial challenges to incorporating large amounts of wind power into a grid system. Intermittency and the non-dispatchable nature of wind energy production can raise costs for regulation, incremental operating reserve, and (at high penetration levels) could require an increase in the already existing energy demand management and load shedding. However these challenges are no different in principle to the substantial challenges imposed by other forms of generation such as nuclear or coal power, which can also show very large fluctuations during unplanned outages and have to be accommodated accordingly.

Currently, wind farms are operated based on the "ramp rates" of the particular wind turbines. The ramp rate for a particular turbine (or collection thereof) is expressed in kilowatts/second and represents the rate of change in power production that the wind turbine can provide at normal operating conditions. Each individual turbine may have a ramp up rate and a ramp down rate representing, respectively, the change band of upper and lower limits of the power production of the turbine. The wind farm as a whole may have a total output referred to herein as the farm ramp rate ($RR_{farm}$), which is the aggregate of all of the power change provided to the power collection system.

Utility companies in general, and those connected to a wind farm in particular, have the requirement to keep the power grid they create out of fluctuations caused by high produced power changes. That is, there may be spikes in $RR_{farm}$ caused by increases in wind rate that need to be avoided.

In the even that wind speed increases, the additional power created may be shed so that the wind farm as a whole produces a constant output. The shedding may be accomplished by ramping the power output down from one level to another. That is, the conversion rate of one or more of the wind turbines is ramped down (based on a ramp down signal) from one level to a lower level to create a lower power output. This, however, leads to the loss of power that could otherwise have been created by the wind turbine if running at a higher conversion rate.

In the event that wind decreases, the efficiency is ramped up to meet the output demands (based on a ramp up signal). That is, the conversion rate of one or more of the wind turbines is ramped up from one level to a higher level to create a power output that meets the demand. However, in the event of a large decrease in wind, regardless of conversion efficiency, at present there may be no way to meet the power production demands. Thus, the utility must find other ways to provide the needed power. This may include, for example, including a diesel generator at the wind farm that is brought on-line when wind speed decreases in an attempt to keep $RR_{farm}$ at or above the desired rate.

BRIEF DESCRIPTION OF THE INVENTION

According to one aspect of the invention, a control system for an energy production facility is provided. The control system includes a plant controller for receiving an indication of a measured power output of the energy production facility that includes power generators and produces output signals. The system also includes a processing unit operably coupled to the plant controller and responsive to executable computer instructions when executed on the processing unit cause the plant controller to: create an output signal that causes an energy storage device to discharge in the event power reserves of the power generators can not met the requested ramp down rate; and create an output signal that causes the energy storage device to charge up in the event that the power capability of the power generators can meet the requested ramp down rate.

According to another aspect of the present invention, a wind farm is provided. The wind farm of this aspect includes a power collection system and at least one wind turbine generator coupled to the power collection system. The wind farm of this aspect also includes at least one energy storage device coupled to the power collection system and a sensor coupled to the power collection system for measuring a rate of power production of the wind farm. The wind farm of this aspect also includes a plant controller coupled to the at least one wind turbine generator, the at least one energy storage device and the sensor. The plant controller causes the at least one energy storage device to store energy in the event that the rate of power production of the wind farm exceeds an output requirement and causes the at least one energy storage device to discharge energy in the event that the rate of power production of the wind farm is less than the output requirement of the wind farm.

In yet another aspect of the present invention, a method of operating a power production facility is provided. The method of this aspect includes receiving at a plant controller a current power production rate of the power production facility; determining at the plant controller that the current power production rate is either below or above a power production rate requirement; transmitting a signal from the plant controller to cause a power producing device to charge an energy storage device in the event that power production rate is above the power production rate requirement or to cause the energy storage device discharge in the event that the power production rate is below the power production rate requirement.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments disclosed herein may provide an energy storage device to a power production facility. In one embodiment, the power production facility is a wind farm that includes wind turbine generators. Of course, the power production facility could be any type of power production facility and may include power production devices other than wind turbine generators. The energy storage device may store excess energy produced during times of high wind or when the required energy is less than what the wind farm is capable of producing given current wind conditions. This stored energy may be utilized, for example, during times of decreased wind to keep the level of $RR_{farm}$ at or near a desired level. In addition, one embodiment allows the plant controller for the power production facility to communicate the total power available from both the power production devices and the energy storage device to the utility so that the utility may plan accordingly. In another embodiment, in the event that the grid becomes unstable or otherwise operates in an out of specification manner, the ramp up and ramp down rates for the power production devices may be adjusted based on grid frequency in an attempt to match power production to power consumption.

Figure 1:
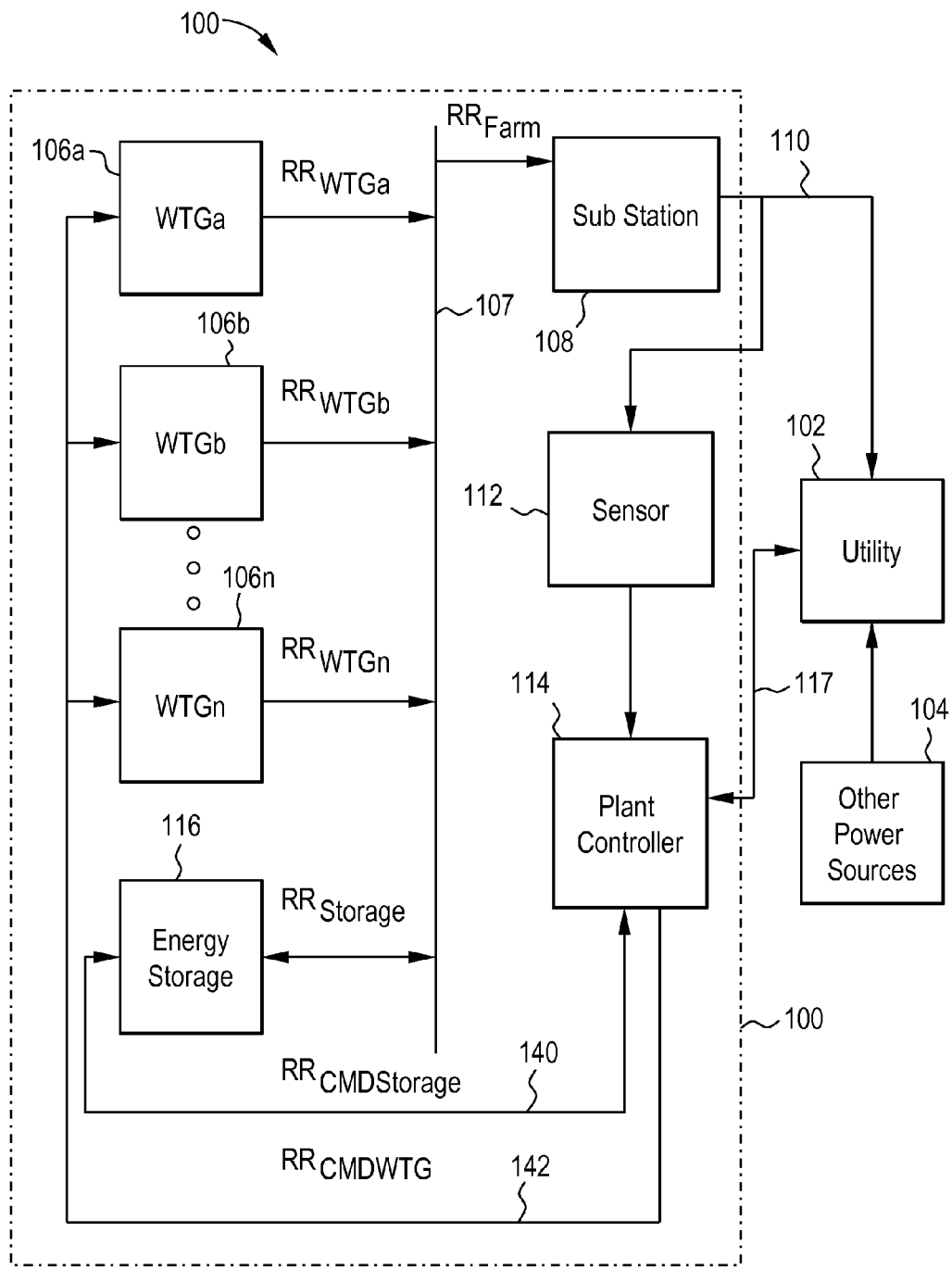
FIG. 1 is a block diagram showing a power production facility implemented as a wind farm coupled to a utility according to one embodiment of the present invention.

FIG. 1 shows a block diagram of power production facility 100 according to one embodiment coupled to an electric utility 102. The power production facility 100 may be referred to herein as a wind farm but it shall be understood that a wind farm is merely an example of a power production facility to which the teachings herein may be applied. Accordingly, the term power production facility as used herein is not limited to wind farms but from time to herein the power production facility 100 may be referred to as a wind farm for ease of explanation.

The electric utility 102 may be any producer of power that receives power from one or more sources and provides it to other users of electricity. Of course, the electric utility 102 could be coupled to additional power sources 104 other than the power production facility 100 to accommodate variability in power output of the wind farm 100 due to intermittent wind conditions. The other power sources 104 may include, for example, thermal, hydroelectric or nuclear power stations, among others.

In the event that the power production facility 100 is a wind farm, it may include one or more wind turbine generators (WTG's) 106a . . . 106n. It shall be understood, however, that the WTGs could be other types of power producing devices.

WTGs 106 may include turbine rotors having plurality of blades that drive rotors of electrical generators to produce electrical power. The electrical power ramp rate provided by each WTG 106 is shown as $RR_{WTGx}$ in FIG. 1. Each of the WTGs 106 may include settings that affect the amount of power they produce. As described above, to increase the power output of a given WTG 106 for a particular input (e.g., wind speed), the WTG 106 receives a ramp up signal that generally limit the increase of conversion rate of the WTG 106. Likewise, to limit the decrease of power output of a given WTG 106 for a particular input (e.g., wind speed), the WTG 106 receives a ramp down signal that generally limit the decrease of the conversion rate of the WTG 106.

The WTG's 106 may be coupled to a power collection system 107. In one embodiment, the power collection system 107 may be implemented as a medium voltage distribution network that couples power from multiple feeders (not shown), each feeder coupling power outputs of a plurality of WTGs 106. In certain embodiments, power is coupled from the WTGs 106 to the feeder via switching devices that may include, for example an electrical circuit breaker. Such switching devices are generally used in wind power generation systems to shut down power generation by one or more of the wind turbine generators during high wind conditions. In one embodiment, the power collection system 107 couples the power ramp rates from each WTG 106 ($RR_{WTGa}$ . . . $RR_{WTGx}$) together to create a system power ramp rate output expressed as $RR_{farm}$ in FIG. 1. $RR_{farm}$ may be a change rate expressed in kW/second.

The change rate, shown as $RR_{farm}$ in FIG. 1, is provided to a station substation 108. The substation 108 may include a transformer that couples $RR_{farm}$ to a high-voltage transmission system 110. The high-voltage transmission system 110 is commonly referred to as the "grid." In particular, the transformer may increase the voltage of its input so it may be provided to and transported by the high-voltage transmission system 110. The high-voltage transmission system 110 is coupled to the utility 102.

The power production facility 100 may also include a sensor 112 coupled to the high-voltage transmission system 110. The sensor 112 measures the voltage and current (e.g. power) output by the station substation 108. The sensor 112 may be a grid measurement device that includes voltage and current transformers. Of course, the sensor could also be coupled to power collection system 107 rather than the high-voltage transmission system 110 or to both.

The sensor 112 may be coupled to a plant controller 114. In one embodiment, the plant controller 114 is coupled via a communications interface 117 to the utility 102. The facility interface 117 may allow for bidirectional signal transfer between the plant controller 114 and the utility 102. The facility interface 116 may be realized as a communication network or hardware interface.

The plant controller 114 may be implemented in a variety of manners. For example, the plant controller could be a computing device that includes a processing unit for carrying out some or all of the processes disclosed herein. In the prior art, the plant controller 114 provided ramp rates (as either ramp up or ramp down signals) to the individual WTGs 106. In operation, a change in a ramp rate is not instantaneous. Rather, the ramp rate of the particular WTG 106 may be ramped up to meet certain power requirements and ramped down to meet lower power requirements according to power production "set points" that may be received by the plant controller 114 from the utility 102.

In the event that the utility requests a higher power setpoint, the ramp up rate of the WTG 106 is controlled to met the utility ramp up requirements. In some instances, this may result in the WTG's 106 being run at less than optimal efficiency and may result in power being lost. Similarly, in the event that wind decreases, the efficiency of the WTGs 106 may be increased (the WTG is ramped up according to a ramp up rate) to attempt to match the output of the WTGs to that power demanded by the utility 102. Of course, there may exist instances where the WTG's 106 are not receiving enough wind to meet output requirements. The plant controller 114 according to one embodiment may be configured to deal with these and other shortcomings in the prior art.

In one embodiment, the power production facility 100 may include an energy storage device 116 coupled in parallel with the WTGs 106. The energy storage device 116 may be any type of device capable of storing electrical energy for later use. Examples include, but are not limited to, flywheels and batteries. In one embodiment, excess energy produced by the WTGs may be stored in the energy storage device 116. The energy may be provided to the energy storage device 116 through the power collection system 107. In one embodiment, the energy storage device 116 may be used to provide stored energy to the substation 108 to supplement the energy provided by the WTGs 106.

The WTG's 106 and the energy storage device 116 are coupled to the plant controller 114. The plant controller 114 provides signals to the WTGs 106 to vary their outputs ($RR_{WTGx}$) to meet certain output requirements. As discussed below, the WTG's 106 may not be able to meet the power requirements and the energy storage device 116 may be ramped-up to help meet the power requirement. In FIG. 1, signals to control the ramp rates of the WTGs are shown as $RR_{CmdWTG}$ and signals to control the ramp rate of the energy storage device 116 are shown as $RR_{CmdStorage}$. It shall be understood that the energy storage device 116 may both receive power from and provide power to the power collection system 107 depending on its configuration or operational mode at a particular time. This configuration/operational mode (charge or discharge) is controlled, for example, by signals received by it from the plant controller 114.

According to one embodiment, the utility 102 may communicate with plant controller 114 via facility interface 117 to adjust amount of energy required. To meet these changes, the plant controller 114 may either ramp up or ramp down one or more of the WTGs 106. Two values may be needed to define a ramp rate, power span and time span. The plant controller 114 may monitor (either continuously or periodically) the actual power produced by the power production facility 100 with the sensor 112.

On a ramp up cycle (wind increases or the utility 102 sets an increased power output set point) the plant controller 114 controls the ramp rate for the facility 100 ($RR_{farm}$) by sending individual command to the WTGs 106 and the energy storage device 116. During this cycle it is possible to improve the ramp rate of the WTGs ($RR_{WTGx}$) and expend energy stored in the energy storage device 116 at the same time to meet demand. The energy storage device 116 may be charged when the possible power of all of the WTGs exceeds the requested power.

On a ramp down cycle (decreased power set point) the plant controller 114 adjusts the power output of the WTGs 106 (via signal $RR_{CmdWTG}$ on communication line 142) such that extra energy produced is first used to charge the energy storage device 116 before ramping down of the WTGs 106. This may occur until the energy storage device 116 is fully charged. After fully charging the energy storage device 116, the WTGs 106 are then ramped down to meet the lower power set point. In this manner, at least some of the extra power that would have been lost in the prior art is stored for later use.

In the event that wind has decreased, the plant controller 114 has no control on the ramp down rates of the WTGs 106. That is, if the wind decreases to a low enough level, regardless of the operation of the plant controller 114, power production facility 100 may not be able to meet the required set point. In this case, the plant controller 114 may be configured to cause the energy storage device 116 (via signal $RR_{CmdStorage}$) to discharge to meet the adjusted ramp down rate set by the utility. In other words, when the wind decreases and power produced by the wind farm 100 decreases faster than the ramp rate set by the utility 102, the plant controller 114 causes the energy storage device 116 to discharge to meet the power requirements of the utility 102 until, hopefully, the wind increases or the utility lowers the power requirements.

As discussed above, the plant controller 114 may be coupled via facility interface 117 to the utility 102. The facility interface 117 may allow for the plant controller 114 and the utility to pass information between them such as, for example, the amount of power ramp rate (e.g., $RR_{farm}$) the utility 102 is requesting from the power producing facility 100. In one embodiment, the plant controller 114 may provide electrical variables of the configured ramp rates of the wind farm 100 and the availability of these values to the utility 102. That is, the plant controller 114 may be configured to calculate the up and down ramp rate availability ($RR_{UpAvail}$ and $RR_{DownAvail}$, respectively) that the power producing facility 100 may provide to the utility 102. In one embodiment, the availability may be calculated based on the relation between the possible power of the power producing facility 100, the power set point, and the charge status of the energy storage device 116. With this information, the utility 102 may be able to improve power resource plans. For example, when the power down limit exceeds $RR_{DownAvail}$, the utility may start one of the other power sources 104 (such as a conventional power plant) to stabilize the ramp down rate.

Figure 2:
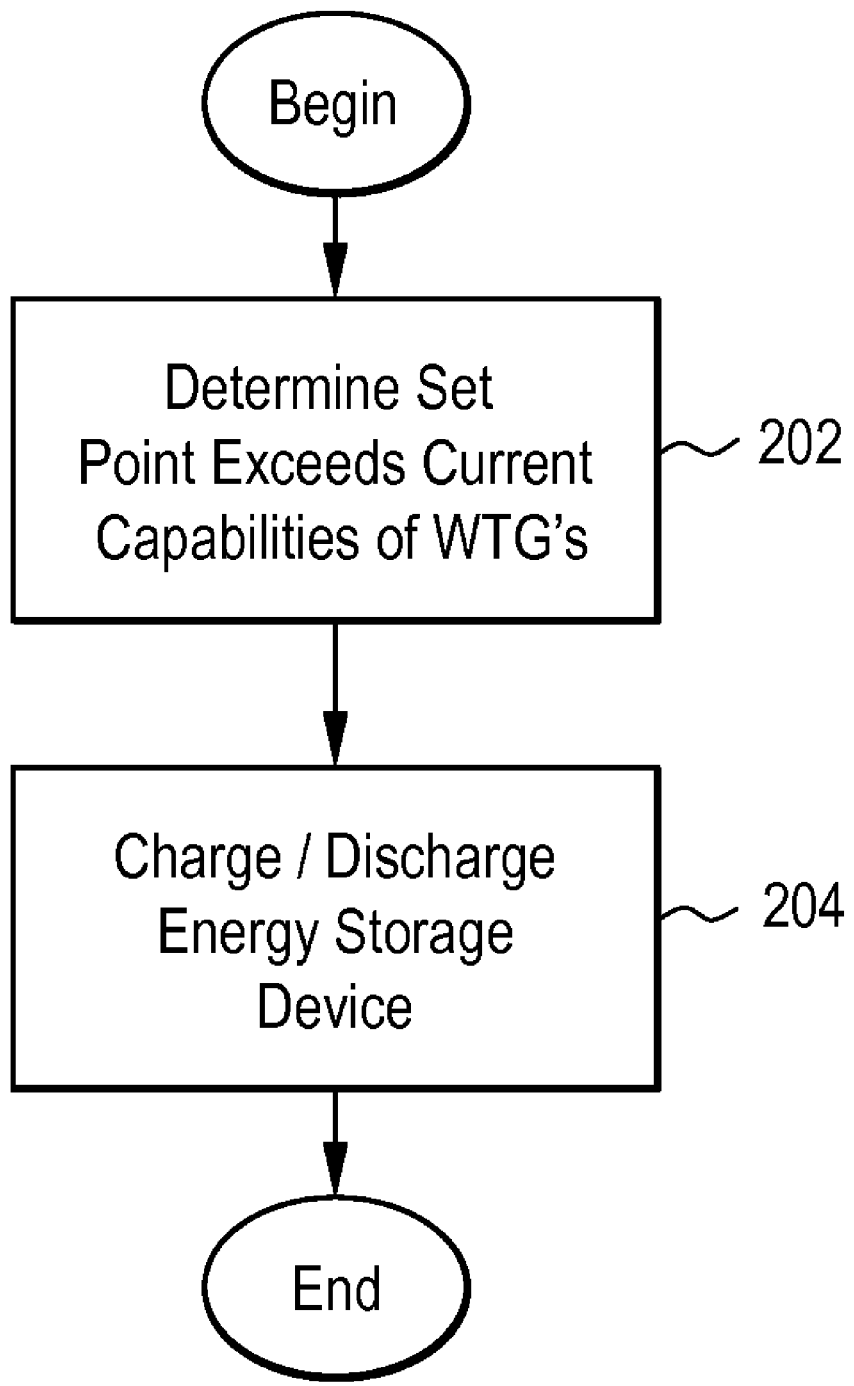
FIG. 2 is a flow chart showing a method of operating a power production facility and charging a storage device according to one embodiment of the present invention.

FIG. 2 shows a flow chart of a process for controlling the operation of a wind farm in the event that the wind is decreasing. If shall be understood that the process shown in FIG. 2 may be performed, for example, by the plant controller 114 (FIG. 1). Of course, the process could be done in other parts of the wind farm or at another location. In the following description, the term wind farm shall be used. However, as discussed above, the teachings are not limited to wind farms and may be applied to other types of power producing facilities.

The process begins at a block 202 where it is determined that the set point for the wind farm desired by the utility exceeds the power output capabilities of the farms' WTGs running at a high or maximum conversion rate. If the WTGs could meet the set point, the process in FIG. 2 is not invoked and the plant controller merely increases the WTG efficiency (e.g., it ramps them up) to meet the set point as in the prior art.

At a block 204, the process causes the energy storage device 116 (FIG. 1) to begin discharging into the power collection system 107. The discharge rate of the energy storage device 116 (FIG. 1) may be controlled such that it, in combination with the WTGs 106 (FIG. 1), meets the set point.

Figure 3:
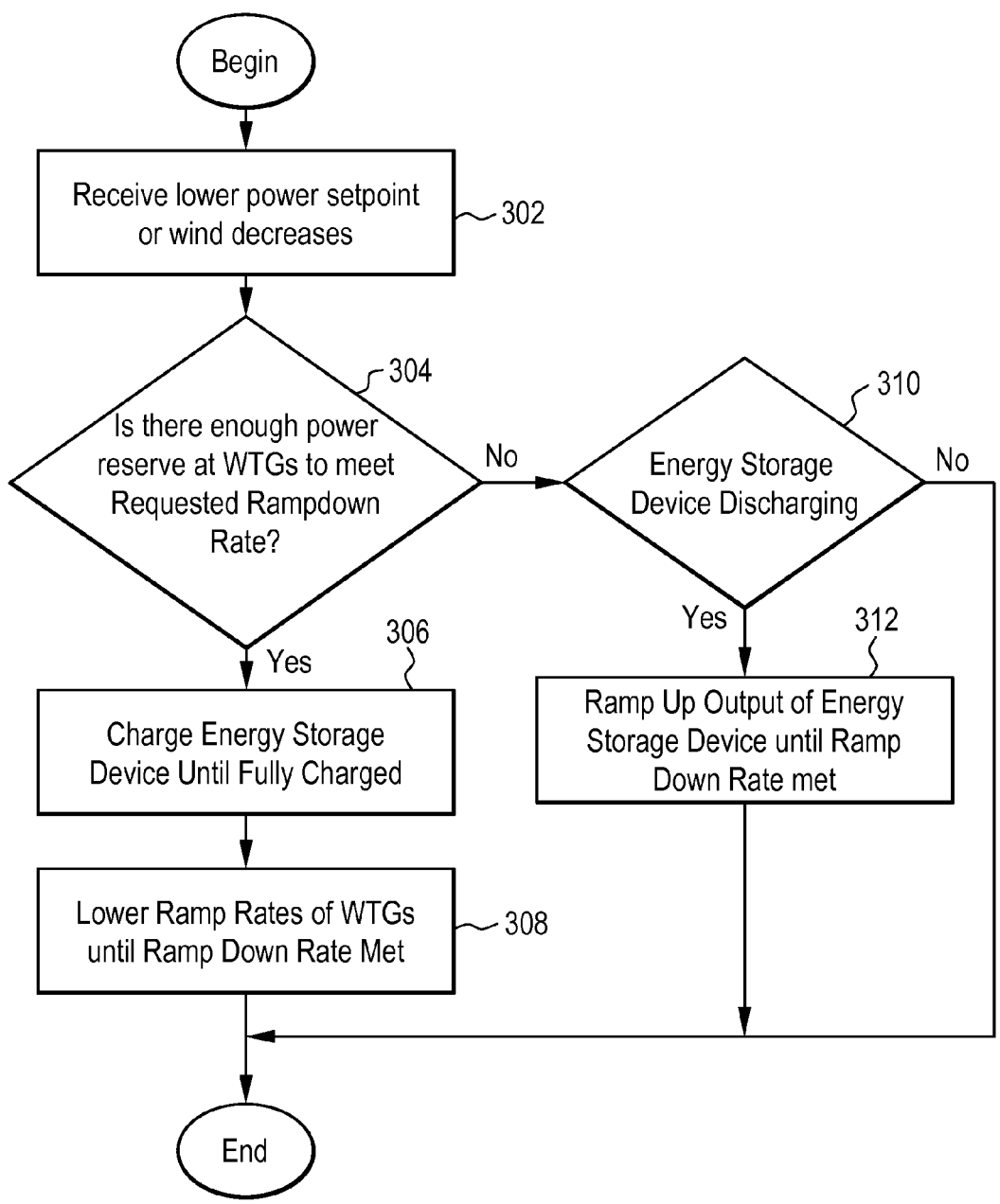
FIG. 3 is a flow chart showing a method of operating a power production facility according to one embodiment of the present invention when a ramp down rate is received.

FIG. 3 shows a flow chart of the process for controlling the operation of a wind farm in the event that the utility lowers the power set point of the wind farm or the power is reduced due to lower wind conditions. Ramp down rate setpoints are provides by the utility. At a block 302 a lower power setpoint is received from the utility or other external entity that may control the output requirements of the wind farm. At a block 304 it is determined if there is enough power reserve at WTGs to meet the requested ramp down rate. That is, at block 304, it is determined if the power producing capacity of the wind farm exceeds the demand for power set by the utility. In the event that it does, the wind farm could produce more power than needed and the process moves to a block 306. In the prior art, this excess capacity may have been lost.

At block 306 the energy storage device is charged until it is fully charged. The rate that the energy storage device is charged will, of course, depend on the amount by which the wind farm may exceed the demand. In one embodiment, the plant controller 114 may receive an indication of the charge level of the energy storage device 116 from the energy storage device 116 (FIG. 1). Accordingly, and referring back to FIG. 1, the energy storage communications path 140 between the plant controller 114 and the energy storage device 116 may be bi-direction in one embodiment.

Of course, it should be understood, that in the event that a particular wind farm has multiple energy storage devices, the process shown in FIG. 3 may remain in block 306 until all of the energy storage devices are fully charged. Of course, in some instances, other external conditions (such as a change of wind conditions or a new set point is received from the utility) may cause the plant controller 116 to begin a new or different process before the energy storage devices are fully charged. In such an instance, the process shown in FIG. 3 may terminate and the new process begins.

At a block 308, after the energy storage device has been fully charged, the plant controller 114 (FIG. 1) may reduce the conversion rate of the WTGs downward so that the power output from them meets the ramp rate set by the utility. When the power output of the wind farm meets the new set point, the process shown in FIG. 3 is complete.

In the event that the WTGs can't meet the requested ramp down rate, at a block 310 it is determined if the energy storage device is discharging. If it is, it means that the wind farm was previously relying on the energy storage device to meet the set point and still must because it has already been determined that the new set point exceeds the power producing capabilities of the WTGs. In such a case, at a block 312, the discharge rate of the energy storage device is increased such the total power output of the wind farm meets the requested ramp rate received by the utility.

If the energy storage device is not discharging, as determined at block 310, it means that energy storage device has already discharged and the wind farm simply cannot meet the ramp rate received by the utility so the process ends. Of course, there may be other processes for informing the utility of this short fall in power production.

Figure 4:
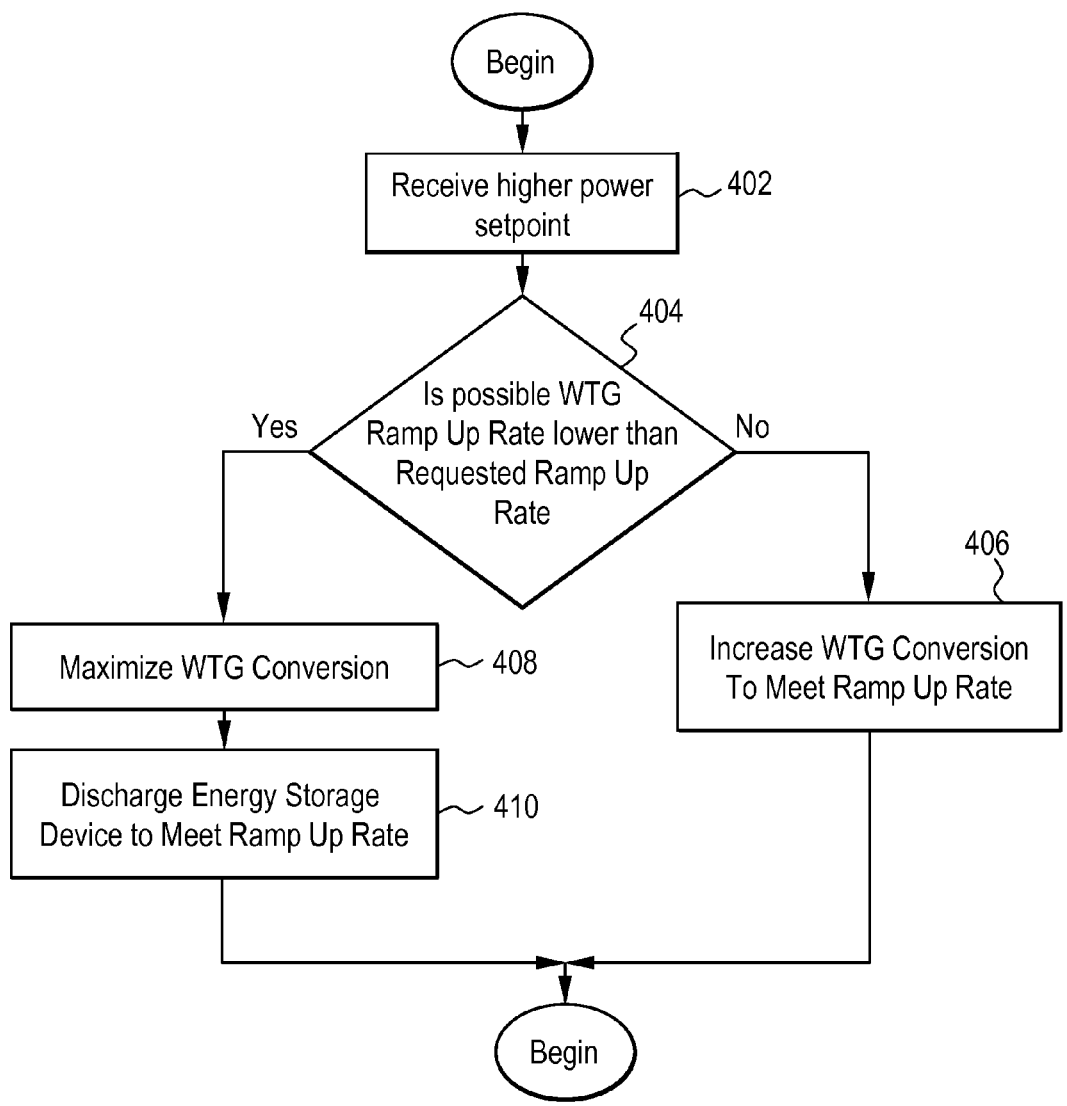
FIG. 4 is a flow chart showing a method of operating a power production facility according to one embodiment of the present invention when a ramp up rate is received.

FIG. 4 shows another process that may be implemented in the event that the power production requirements of the wind farm increase. At a block 402 a new power setpoint is received from the utility or other external entity that may control the output requirements of the wind farm. This new power setpoint is higher than the current power setpoint. The ramp up setpoint is provided by the utility, too.

At a block 404 it is determined if the requested ramp up rate exceeds the capabilities of the WTGs. If it does not, at a block 406, the conversion rates to for the WTGs are increased to meet the new set point (new ramp up rate). This is similar to what is done in a typical wind farm without an energy storage device.

In the event that the requested ramp up rate does exceed the current ramp up capabilities of the WTGs, processing moves to block 408 where the power conversion for the WTGs of the plant are improved. At a block 410, the energy storage device is discharged to meet the new ramp up rate. This may include setting the discharge rate of the energy storage device based on the shortfall in WTG power production with respect to the new ramp up rate.

The preceding description has been based on an assumption that that the utility provides the ramp up and ramp down rates to the plant controller. That is, the ramp up and ramp down rates are set points set by the utility. However, there may exist instances where the plant controller itself may be in a position adjust the ramp rates received from the utility to better match operating conditions.

To that end, one embodiment may include modifying the value of $RR_{farm}$ (and ultimately, the RR for each WTG) based on the frequency of the power grid (e.g., the frequency of the high-voltage transmission system 110 of FIG. 1). The sensor 112 (FIG. 1) may be able to monitor this frequency and that information to the plant control. In the event that the grid frequency is greater than a desired quantity, it may be assumed that the wind farm is producing power at a rate that is below demand. In the event that the grid frequency is less than the desired quantity, it may be assumed that the wind farm is producing power at a rate that exceeds demand.

Figure 5:
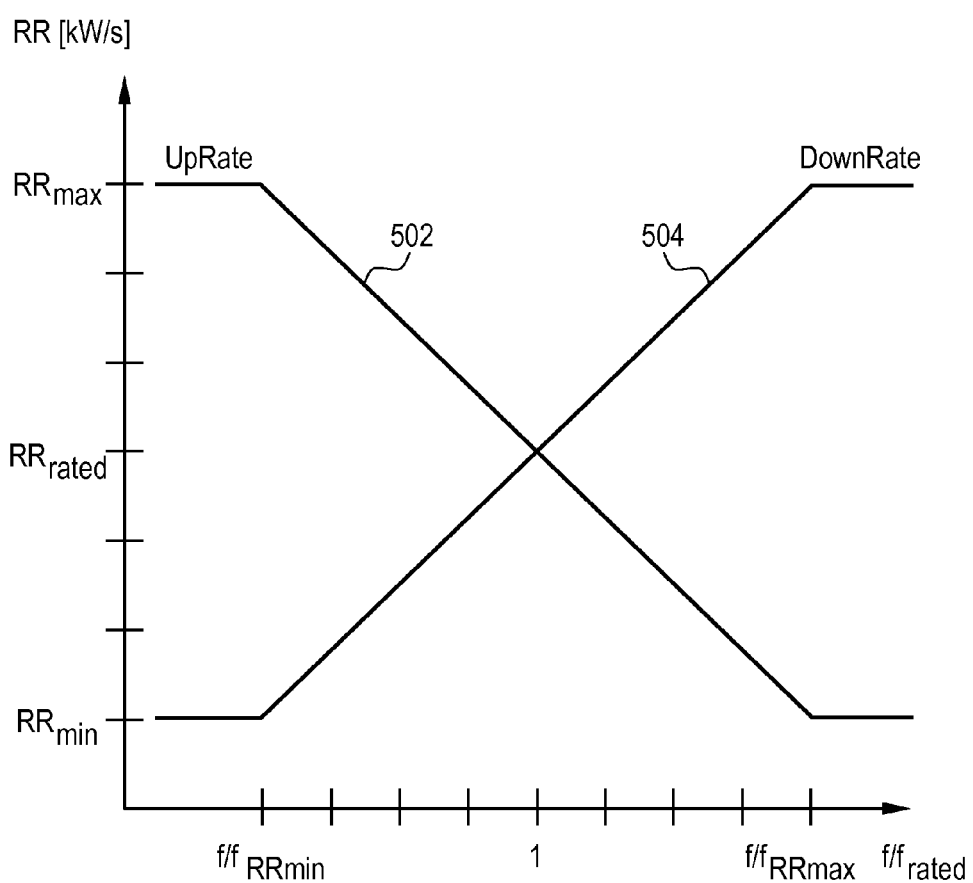
FIG. 5 shows a graph of the variations of ramp up rates and ramp down rates based on frequency.

According to one embodiment, independent of commands sent by the plant controller 114 (FIG. 1) may modify the ramp up and ramp down rates based on frequency of the grid. In general, the plant controller may increase power production when the system frequency drops below a minimum frequency threshold ($f_{RRmin}$) and decrease the power production when the system frequency is above maximum frequency ($f_{RRmax}$). This operational mode may in one embodiment, be active between these two frequency thresholds. Depending on whether the current operation of the wind farm is based on a ramp up rate or a ramp down rate, one of two possible variations may be made. In the event that grid frequency decreases towards $f_{RRmin}$ the ramp up rate is increased to stabilize the frequency and the ramp down rate is decreased to protect against large power drops that may influence grid frequency. In the case of an increase in frequency relative to the value of $f_{RRmax}$, the above described behavior may be reversed. That is, the ramp up rate decreases to protect against large power peaks, which may influence the grid frequency, and the ramp down rate increases to stabilize the frequency. FIG. 5 shows a graph of the variations (or curves) of the ramp up rate 502 and the ramp down rate 504 based on frequency. The graph in FIG. 5 show grid frequency normalized with respect to $f_{rated}$ for the grid (typically 60 Hz in the US) along the x-axis and the ramp rate for the farm on the y-axis. Of course, the shape of the ramp up rate 502 and ramp down rate 504 curves may take on any shape and those shown in FIG. 5 are by way of example only.

In support of the teachings herein, various analysis components may be used, including digital and/or an analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement methods of the present invention. These instructions may provide for equipment operation, control, data collection and analysis and other functions deemed relevant by a system designer, owner, user or other such personnel, in addition to the functions described in this disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A wind farm comprising:
    a power collection system;
    at least one wind turbine generator coupled to the power collection system;
    at least one energy storage device coupled to the power collection system;
    a sensor coupled to the power collection system for measuring a rate of power production of the wind farm;
    a plant controller coupled to the at least one wind turbine generator, the at least one energy storage device and the sensor, the plant controller causing the at least one energy storage device to store energy in the event that the rate of power production of the wind farm exceeds an output requirement and causing the at least one energy storage device to discharge energy in the event that the rate of power production of the wind farm is less than the output requirement of the wind farm;
    wherein the plant controller provides a signal to a utility that indicates a ramp rate availability that is calculated based on a relation between the possible power of the wind farm, a power set point and a charge status of the energy storage device.

2. The wind farm of claim 1, wherein the energy storage device is a battery.

3. The wind farm of claim 1, wherein the energy storage device is a spinning wheel.

4. The wind farm of claim 1, wherein the plant controller is coupled via a facility interface to the utility.

5. The wind farm of claim 1, wherein:
    the sensor also measures a frequency of the power produced by the wind farm provides the frequency to the plant controller; and
    the plant controller varies the operation of the at least one wind turbine generator based on the frequency.

* * * * *